US012031059B2

(12) United States Patent
Shepherd et al.

(10) Patent No.: US 12,031,059 B2
(45) Date of Patent: Jul. 9, 2024

(54) MIXTURE CURABLE TO PROVIDE AN INTUMESCENT COATING MATERIAL

(71) Applicant: Advanced Innergy Ltd., Gloucester (GB)

(72) Inventors: Simon Harry Shepherd, Gloucester (GB); Laura Louise Jordan, Gloucester (GB); Simon Jones, Gloucester (GB); Anil Naik, Gloucester (GB)

(73) Assignee: Advanced Innergy Ltd, Gloucester (GB)

( * ) Notice: Subject to any disclaimer, the term of this patent is extended or adjusted under 35 U.S.C. 154(b) by 671 days.

(21) Appl. No.: 17/286,447

(22) PCT Filed: Oct. 11, 2019

(86) PCT No.: PCT/GB2019/052894
§ 371 (c)(1),
(2) Date: Apr. 16, 2021

(87) PCT Pub. No.: WO2020/079401
PCT Pub. Date: Apr. 23, 2020

(65) Prior Publication Data
US 2021/0388218 A1 Dec. 16, 2021

(30) Foreign Application Priority Data
Oct. 18, 2018 (GB) ..................................... 1816974

(51) Int. Cl.
| | | |
|---|---|---|
| C09D 5/18 | (2006.01) | |
| C09D 7/20 | (2018.01) | |
| C09D 7/40 | (2018.01) | |
| C09D 7/65 | (2018.01) | |
| C09D 183/04 | (2006.01) | |

(52) U.S. Cl.
CPC .............. C09D 5/185 (2013.01); C09D 7/20 (2018.01); C09D 7/65 (2018.01); C09D 7/70 (2018.01); C09D 183/04 (2013.01)

(58) Field of Classification Search
CPC ... C09D 5/18; C09D 7/20; C09D 7/65; C09D 7/40; C09D 183/04

USPC .......................................................... 523/179
See application file for complete search history.

(56) References Cited

U.S. PATENT DOCUMENTS

| | | |
|---|---|---|
| 4,879,320 A | 11/1989 | Hastings |
| 6,828,355 B1 | 12/2004 | Chu |
| 2003/0100669 A1 | 5/2003 | Lewis et al. |
| 2009/0142495 A1 | 6/2009 | Green et al. |
| 2012/0174508 A1 | 7/2012 | Brooks et al. |
| 2016/0160059 A1* | 6/2016 | Anderson ............ C09D 163/00 427/385.5 |
| 2016/0168394 A1 | 6/2016 | Kreh |

FOREIGN PATENT DOCUMENTS

| | | |
|---|---|---|
| CN | 102209762 A | 10/2011 |
| CN | 104245868 A | 12/2014 |
| DE | 102010054341 B3 | 1/2012 |
| TW | 201533183 A | 9/2015 |
| WO | 9111498 A1 | 8/1991 |
| WO | 03066749 A1 | 8/2003 |
| WO | 2015007627 A1 | 1/2015 |
| WO | 2015007628 A1 | 1/2015 |
| WO | 2020079401 A1 | 4/2020 |

OTHER PUBLICATIONS

"International Search Report and Written Opinion for PCT Patent Application No. PCT/GB2019/052894", Mailed Date: Jan. 27, 2020, 12 Pages.
"Second Office Action for Chinese Patent Application No. 201980068726X", Mailed Date: Aug. 11, 2022, 4 pages.
Yiping, et al., "Building Functional Materials", 5 pages.
"First Office Action for Chinese Patent Application No. 201980068726X", Mailed Date: Nov. 26, 2021, 29 pages.

* cited by examiner

*Primary Examiner* — Deve V Hall
(74) *Attorney, Agent, or Firm* — Calfee, Halter & Griswold LLP

(57) ABSTRACT

A mixture curable to provide an intumescent coating material. The mixture comprises a silicone polymer, a crosslinker, a diluent and an intumescent ingredient. The mixture comprises at least 50% by weight of the intumescent ingredient.

18 Claims, No Drawings

MIXTURE CURABLE TO PROVIDE AN INTUMESCENT COATING MATERIAL

TECHNOLOGICAL FIELD

Examples of the disclosure relate to a mixture curable to provide an intumescent coating material, an intumescent coating material, a method of providing an intumescent coating material, an intumescent coating, and a method of protecting a substrate with an intumescent coating.

BACKGROUND

It is often required to provide an intumescent coating around substrates such as pipework, valves, I-beams and other process components, structural members, and particularly in hydrocarbon facilities on or off shore. Such a coating when subjected to a fire event expands to form a protective char. The protective Char acts as a physical barrier insulating the substrate and therefore delaying the effects of a fire and slowing the rate of temperature increase of the coated substrate. This therefore potentially protects the substrate from failing or delays the occurrence of failure, thereby providing additional time to permit evacuation of personnel and/or fire fighting.

There is a requirement to provide intumescent coatings which have improved properties in regard to delaying the effects of a fire and slowing the rate of temperature increase of the coated substrate.

All proportions referred to in this specification are indicated as % by weight of the total composition.

BRIEF SUMMARY

According to various, but not necessarily all, examples of the disclosure there is provided a mixture curable to provide an intumescent coating material, wherein the mixture comprises a silicone polymer, a cross-linker, a diluent and an intumescent ingredient, wherein the mixture comprises at least 50% by weight of the intumescent ingredient.

The mixture may comprise 50 to 68% by weight of the intumescent ingredient, and preferably may comprise 55 to 60% by weight of the intumescent ingredient. The mixture may comprise at least 55% by weight of the intumescent ingredient.

The intumescent ingredient may comprise a phosphorus containing compound, a gas source, a carbon source.

The mixture may comprise 10 to 40% by weight of the phosphorus containing compound, and preferably may comprise 25 to 35% by weight of the phosphorus containing compound. The phosphorus containing compound may comprise ammonium polyphosphate, triphenyl phosphate, or aluminium phosphinate.

The mixture may comprise 5 to 20% by weight of the gas source, and preferably may comprise 8 to 14% by weight of the gas source. The gas source may comprise melamine or boric acid.

The mixture may comprise 3 to 15% by weight of the carbon source, and preferably may comprise 8 to 14% by weight of the carbon source. The carbon source may comprise pentaerythritol.

The intumescent ingredient may comprise an infrared blocker. The mixture may comprise 1 to 15% by weight of the infrared blocker, and preferably may comprise 1 to 10% by weight of the infrared blocker. The infrared blocker may comprise titanium dioxide.

The mixture may comprise 1 to 35% by weight of the diluent, and preferably may comprise 2 to 15% by weight of the of the diluent. The diluent may comprise at least one of: a volatile diluent, a non-reactive diluent, or a reactive diluent.

The volatile diluent may comprise a solvent. The solvent may comprise an organic solvent. The organic solvent may comprise xylene, toluene, alkanes, alkenes, or aromatics. The mixture may comprise 1 to 20% by weight of the volatile diluent, and preferably may comprise 2.5 to 10% by weight of the of the volatile diluent.

The non-reactive diluent may comprise a plasticiser. The plasticiser may comprise trimethyl terminated polydimethyl siloxane with viscosity range of 0.65 cSt to 1000 cSt, a mixture of aliphatic and aromatic hydrocarbons with 7-30 carbon atoms, mellitates, phthalates, sebacates or adipates. The mixture may comprise 4 to 20% by weight of the non-reactive diluent, and may comprise 7 to 15% by weight of the non-reactive diluent, and preferably may comprise 8 to 11% by weight of the of the non-reactive diluent.

The reactive diluent may comprise functionalised polydialkyl siloxane, polydialkyl siloxane polyether copolymer chains with hydroxy, alkoxy, carbinol, epoxy, vinyl, SiH, acrylate, isocyanate or amino functionalities. The alkoxy may comprise: methoxy, ethoxy, propoxy, or butoxy. The mixture may comprise 1 to 35% by weight of the reactive diluent, and preferably may comprise 5 to 10% by weight of the of the reactive diluent.

The mixture may comprise an endothermic fire retardant. The mixture may comprise 0.25 to 6% by weight of the endothermic fire retardant, and preferably may comprise 1 to 4% by weight of the endothermic fire retardant. The endothermic fire retardant may comprise zinc borate, huntite, hydromagnesite, aluminium trihydrate or magnesium hydroxide.

The mixture may comprise reinforcing fibres. The mixture may comprise 0.25 to 8% by weight of the reinforcing fibres, and preferably may comprise 2 to 5% by weight of the reinforcing fibres. The reinforcing fibres may comprise basalt fibres, ceramic fibres or glass fibres, and may be of any length between 50 μm to 15 mm.

The mixture may comprise filler. The mixture may comprise 0.25 to 15% by weight of the filler, and preferably may comprise 2 to 10% by weight of the filler. The filler may comprise at least one of: vermiculite, mica, clay, talc, or microspheres. The microspheres may comprise glass microspheres.

The mixture may comprise 14 to 31% by weight of the silicone polymer, and preferably may comprise 25 to 30% by weight of the silicone polymer. The mixture may comprise less than 40% by weight of the silicone polymer, and may comprise less than 35% by weight of the silicone polymer, and may comprise less than 30% by weight of the silicone polymer.

The mixture may comprise 1 to 10% by weight of the cross-linker, and preferably may comprise 1.5 to 7% by weight of the cross-linker.

Possibly, the mixture comprises less than 5% by weight expandable graphite. Possibly, the mixture comprises less than 3% by weight expandable graphite. Possibly, the mixture comprises less than 1% by weight expandable graphite. Possibly, the mixture is substantially free of expandable graphite.

Possibly, the mixture does not comprise expandable graphite.

The mixture may comprise a thixotropic agent. The mixture may comprise 0.25 to 5% by weight of the thixotropic agent. The thixotropic agent may comprise fumed silica, organosilane, or polyether compounds.

The silicone polymer may comprise at least one condensable or hydrolyzable group. The at least one condensable or hydrolyzable group may comprise hydroxyl groups or alkoxy groups.

The alkoxy groups may comprise methoxy, ethoxy, propoxy, butoxy, isobutoxy, pentoxy, hexoxy or 2-ethylhexoxy; dialkoxy radicals, such as methoxymethoxy, ethoxymethoxy or alkoxyaryloxy, such as ethoxyphenoxy.

The cross-linker may comprise silanes or siloxanes which contain silicon bonded hydrolysable groups such as acyloxy groups (for example, acetoxy, octanoyloxy, or benzoyloxy groups); ketoximino groups (for example dimethyl ketoximo, or isobutylketoximino); alkoxy groups (for example methoxy, ethoxy, isobutoxy or propoxy) and alkenyloxy groups (for example isopropenyloxy or 1-ethyl-2-methylvinyloxy).

The cross-linker may comprise at least three silicon-bonded condensable (preferably hydroxyl and/or hydrolysable) groups per molecule which are reactive with the condensable groups in siloxane polymer.

Silanes and siloxanes which can be used as cross-linkers comprise alkyltrialkoxysilanes, or silyl functional molecules containing two or more silyl groups, each silyl group containing at least one hydrolysable group.

The mixture may be curable in the presence of a metallic catalyst. The metallic catalyst may comprise a tin catalyst or a titanium catalyst. The mixture may be curable in the presence of moisture. According to various, but not necessarily all, examples of the disclosure there is provided an intumescent coating material, wherein the intumescent coating material is the cured reaction product of a mixture comprising a silicone polymer, a cross-linker, a diluent and an intumescent ingredient, wherein the mixture comprises at least 50% by weight of the intumescent ingredient.

According to various, but not necessarily all, examples of the disclosure there is provided a method, the method comprising:
mixing a silicone polymer, a cross-linker, a diluent and an intumescent ingredient to provide a mixture, wherein the mixture comprises at least 50% by weight of the intumescent ingredient;
allowing the mixture to cure to provide an intumescent coating material.

According to various, but not necessarily all, examples of the disclosure there is provided an intumescent coating for protecting a substrate, the intumescent coating comprising an intumescent coating material, wherein the intumescent coating material is the cured reaction product of a mixture comprising a silicone polymer, a cross-linker, a diluent and an intumescent ingredient, wherein the mixture comprises at least 50% by weight of the intumescent ingredient.

The intumescent coating may comprise a plurality of layers of the intumescent coating material.

The intumescent coating may comprise a mesh. The mesh may be provided between respective layers of the intumescent coating material. The mesh may comprise stainless steel, basalt, silica, carbon or glass fibre.

Alternatively, the intumescent coating may not comprise a mesh.

According to various, but not necessarily all, examples of the disclosure there is provided a method of protecting a substrate, the method comprising:
coating the substrate with a mixture curable to provide an intumescent coating material, wherein the mixture comprises a silicone polymer, a cross-linker, a diluent and an intumescent ingredient, wherein the mixture comprises at least 50% by weight of the intumescent ingredient;
allowing the mixture to cure.

The method may comprise providing the substrate with a plurality of layers of the intumescent coating material. The method may comprise providing a mesh between respective layers of the intumescent coating material. The mesh may comprise stainless steel, basalt or glass fibre.

According to various, but not necessarily all, examples of the disclosure there may be provided examples as claimed in the appended claims.

BRIEF DESCRIPTION

For a better understanding of various examples that are useful for understanding the detailed description, reference will now be made by way of example only.

DETAILED DESCRIPTION

As exemplified in table 1, the disclosure provides a mixture curable to provide an intumescent coating material. The mixture comprises a silicone polymer, a cross-linker, a diluent and an intumescent ingredient. The mixture comprises at least 50% by weight of the intumescent ingredient.

Examples of mixture according to the disclosure are provided in the table 1 below.

TABLE 1

| Component | Specific example of component | Specific example 1 (wt %) | Specific example 2 (wt %) | Specific example 3 (wt %) | Specific example 4 (wt %) | Specific example 5 (wt %) |
|---|---|---|---|---|---|---|
| Silicone polymer | Silicone polymer with at least one condensable or hydrolyzable group | 25.86 | 14.56 | 23.7 | 17.42 | 25.86 |
| Cross-linking agent & metallic catalyst | Reactive silane cross-linker & tin catalyst | 5.18 | 2.91 | 2.36 | 5.18 | 5.18 |
| Non-reactive diluent | Silicone plasticiser | 8.62 | None | 3.5 | None | None |
| Non-reactive diluent | Hydrocarbon plasticiser | None | 14.56 | 5.34 | None | None |
| Reactive diluent | Epoxy functional polydialkyl siloxane | None | None | None | 10 | None |
| Volatile diluent | Xylene | None | None | None | None | 6.47 |
| Reinforcing fibres | Basalt fibres | 3.45 | 2.91 | 2.58 | 3.45 | 3.45 |
| Infrared blocker | Titanium dioxide | 8.48 | 8.52 | 1.84 | 8.48 | 8.48 |

TABLE 1-continued

| Component | Specific example of component | Specific example 1 (wt %) | Specific example 2 (wt %) | Specific example 3 (wt %) | Specific example 4 (wt %) | Specific example 5 (wt %) |
|---|---|---|---|---|---|---|
| Phosphorus containing compound | Ammonium polyphosphate | 28.29 | 28.4 | 34.32 | 28.29 | 28.29 |
| Gas source | Melamine | 9.9 | 9.91 | 12.05 | 9.9 | 9.9 |
| Carbon source | Pentaerythritol | 8.48 | 8.52 | 10.4 | 8.48 | 8.48 |
| Endothermic fire retardant | Zinc borate | 1.74 | None | None | 1.74 | 1.74 |
| Filler | HGMS (glass microspheres) | None | 9.71 | 3.91 | None | 2.15 |

In the examples of table 1 above, the first part comprises a silicone polymer with at least one condensable or hydrolyzable group and the second part comprises a reactive silane cross-linker and a tin catalyst. The remaining ingredients are provided in either the first and/or second parts. The first and/or second parts may also comprise other components as is conventional, such as wetting agents, adhesion promoters and processing aids.

The reaction to form an intumescent coating material according to example of the disclosure is initiated by combining the first and second parts. The silicone polymer with at least one condensable or hydrolyzable group and the reactive silane cross-linker react in the presence of the tin catalyst to form a cured silicone base polymer. The reaction is a condensation reaction. Accordingly, the intumescent coating material according to examples of the disclosure comprises a cured silicone base polymer with the remaining ingredients being dispersed within the cured silicone base polymer.

In other examples, an intumescent coating material according to example of the disclosure may be formed from a one-part mixture, for example, which cures in the presence of moisture on exposure to the atmosphere.

In some examples the silicone polymer comprises at least one methoxy group.

In some example, the reactive silane cross-linker comprises an alkoxy silane. In some examples the alkoxy silane comprises a primary amine or primary alcohol (silanol group). The alkoxy group of the reactive silane cross-linker may comprise any of: methoxy, ethoxy, propoxy or butoxy.

In examples of the disclosure, the ratio of silicone polymer to cross-linker and metallic catalyst is from 1:1 to 20:1, and more particularly from 3:1 to 15:1. In example 1 above, the ratio is 5:1. In example 2 above, the ratio is 5:1. In example 3 above, the ratio is 10:1. In example 4 above, the ratio is 3:1. In example 5 above, the ratio is 5:1.

In the above examples, the intumescent ingredient comprises ammonium polyphosphate (which is a phosphorus containing compound), melamine (which is a gas source), pentaerythritol (which is a carbon source), and titanium dioxide (which is an infrared blocker). Accordingly, from table 1 above, example 1 comprises 55.15 weight percent intumescent ingredient, example 2 comprises 55.35 weight percent intumescent ingredient, example 3 comprises 58.61 weight percent intumescent ingredient, example 4 comprises 55.15 weight percent intumescent ingredient, and example 5 comprises 55.15 weight percent intumescent ingredient.

The intumescent ingredient provides an intumescent fire-retardant system. The resulting protective Char formed during a fire event has improved insulation and mechanical strength compared to known materials.

In some examples, the material does not comprise expandable graphite. The material is therefore free of expandable graphite. Expandable graphite is a conductor, and therefore removing expandable graphite further improves the insulation properties of the Char.

Expandable graphite lowers the mechanical strength of a Char, and therefore a Char free of expandable graphite improves the mechanical strength of the Char.

In some examples, the material does comprise expandable graphite. Examples are envisaged in which the curable mixture comprises less than 5% by weight, 3% by weight, 1% by weight, and in which the curable mixture is substantially free of expandable graphite. It has been found that such curable mixtures provide materials which have an improved Char and improved mechanical strength (but not to the same degree as mixtures comprising no expandable graphite).

In examples of the disclosure the mixture comprises a diluent. The diluent may be a volatile diluent, a non-reactive diluent or a reactive diluent. In some examples the mixture may comprise a combination of different diluent types, for example, the mixture may comprise a volatile diluent and a non-reactive diluent or any other combination. In other examples, the mixture may comprise two or more different diluents of the same type, for example, two different non-reactive diluents.

A diluent is a low viscosity material. A diluent is a diluting agent. In example mixtures, the diluent decreases viscosity of the mixture to improve flow of the mixture and therefore improves handling properties. Accordingly, example mixtures may be loaded to a greater extent with additives, such as the intumescent ingredient, which would otherwise increase viscosity and make pumping the resultant mixture more difficult. Intumescent materials resulting from the curing of such mixtures therefore have improved fire performance properties, for instance, because such materials have a greater content of intumescent ingredient, than would otherwise be the case. The greater the content of intumescent ingredient the better the fire performance properties. Further, in example mixtures the amount of silicone polymer can be reduced which reduces costs.

In some example, intumescent materials resulting from the curing of mixtures comprising a volatile diluent, such as a solvent, may not comprise the volatile diluent or may comprise a reduced amount of volatile diluent. The amount of volatile diluent in the material may reduce over time. The volatile diluent may evaporate, for example, as the mixture cures to form the intumescent material.

A non-reactive diluent, such as a plasticiser, may be an organic or inorganic liquid. Such liquids are not volatile. Accordingly, a non-reactive diluent present in a mixture is also present in the subsequently cured intumescent material.

Further, a non-reactive diluent is not reactive, for example, with functionality on the silicone polymer or cross-linker, and is therefore present in the subsequently cured intumescent material in the same form as in the mixture. A mixture may comprise a plurality of different non-reactive diluents, for example, a plurality of different plasticisers.

A reactive diluent, such as a functionalised polydialkyl siloxane, in use reacts with the silicone polymer and/or cross-linker. A reactive diluent therefore becomes an integral part of the resulting cured intumescent material. The reactive diluent may become an integral part of the cured silicone base polymer.

In example mixtures, the relative amounts of the intumescent ingredient, silicone polymer and diluent are selected to provide a mixture and a subsequently cured intumescent coating material with the required properties. For example, there must be enough diluent for the mixture to flow and pump well. There must be enough intumescent ingredient to achieve the required fire performance in the cured material. There must be enough silicone polymer to achieve good weather resistance and adhesion in the cured material. Example mixtures provide an optimised balance of these components.

In example mixtures, the ratio of diluent to silicone polymer is selected to provide a mixture and a subsequently cured intumescent coating material with the required properties. The ratio of silicone polymer to diluent may be 1:1 to 5:1, and preferably 3:1. Too much diluent will result in a loss of adhesion as the diluent sweats or leeches out during curing. Too little diluent and the mixture will not be flowable enough and will not be commercially viable.

The silicone polymer provided in the intumescent coating material provides the required degree of flexibility to accommodate expansion and contraction of substrates in response to temperature change which may otherwise damage the coating.

EXAMPLE METHOD

Examples of the disclosure also provide a method. The method comprises mixing a silicone polymer, a cross-linker, a diluent and an intumescent ingredient to provide a mixture. The mixture comprises at least 50% by weight of the intumescent ingredient. The method also comprises allowing the mixture to cure to provide an intumescent coating material.

In one specific example, the silicone polymer is mixed with the phosphorus containing compound, gas source, carbon source, endothermic fire retardant, reinforcing fibres and diluent in a first mixer to provide a first part mixture. In some examples, the silicone polymer is first mixed with the reinforcing fibres under conditions of high sheer, for instance, using a Z-blade mixer to effectively disperse the fibres. Subsequently, the remaining components in the first part mixture are added either together or separately.

Silicone is a lubricant and therefore the Z-blade mixer must be configured to provide sufficient sheer to effectively disperse the fibres within the silicone base polymer.

Other mixer types, such as high speed dispersion mixers or other mixers capable of producing high shear can be used to mix the first part. A premix or masterbatch process can be used, where fibres are dispersed into the silicone polymer in a high concentration in a high shear mixer such as a z-blade mixer, before being diluted with remaining silicone polymer and other ingredients in a second, larger capacity mixer.

In some examples, the cross-linker and metallic catalyst are mixed with the infrared blocker in a second separate mixer to provide a second part mixture. In other examples, the infrared blocker is instead provided in the first part mixture. In examples comprising filler and a thixotropic agent, the filler and thixotropic agent may be mixed with the first and/or second part mixtures.

In other examples, the composition of the first and second part mixtures may be different, for instance, the reinforcing fibres may be dispersed in both the first and second part mixtures to change the viscosity of the respective first and second part mixtures. In some examples, the diluent may be split between the first and second part mixtures.

In a third mixer the first part mixture and second part mixture are mixed. The third mixer may be a two-component dispensing machine with a static or dynamic mixer attachment.

In some examples, the first and second part mixtures are mixed together in the third mixer immediately before application to a substrate since the combined first and second part mixtures in the presence of catalyst and atmospheric moisture start to cure immediately to provide the cured intumescent coating material. The cure rate is though controllable by selection of reagents to allow sufficient time to apply the material to a substrate.

The mixture may be applied to a substrate by being pumped though a nozzle and smoothed over manually using a roller. Alternatively, the mixture may be applied manually using a trowel, followed by smoothing over using a roller. In some instance, the mixture may be applied directly to a substrate on site. Alternatively, the mixture may be pre-cast in house and the cured material subsequently fixed in place to a substrate at a later date.

In some examples, the total amount of intumescent coating material formed was around 680 Kg. Accordingly, a large scale production method has been developed. It will be understood that different amounts of intumescent coating material could be formed as required, and depending on the size of the mixers employed.

Examples of the disclosure also provide an intumescent coating for protecting a substrate. The intumescent coating may comprise a plurality of layers of the intumescent coating material. Each respective layer may have a thickness of up to 15 mm. Layers of a different thickness may be provided as required. The thickness of the layers may be optimised to prevent slumping. Subsequent layers are applied once the preceding layer has cured.

In some examples, the intumescent coating comprises a flexible mesh provided between respective layers of the intumescent coating material to further increase the mechanical strength of the resulting Char. The mesh may comprise stainless steel, basalt or glass fibre. One example of an intumescent coating comprises two layers of material one on top of the other, which each layer having a thickness of 6 mm; a stainless-steel chain mail mesh provided on top of the first two layers, the mesh having a thickness of 1 mm; and a third layer of material provided on top of the mesh, the third layer having a thickness of 2 mm. The total thickness of the intumescent coating is therefore 15 mm. Another example of an intumescent coating comprises a first layer of material having a thickness of 12 mm; a stainless-steel chain mail mesh provided on top of the first layer, the mesh having a thickness of 1 mm; and a second layer of material provided on top of the mesh, the second layer having a thickness of 2 mm. The total thickness of the intumescent coating is therefore 15 mm.

Alternatively, the intumescent coating may not comprise a mesh. The intumescent coating material according to examples of the disclosure provides a Char with a sufficiently high mechanical strength that a mesh is not in fact required. Such examples have a reduced manufacturing cost and lower overall weight.

Examples of the disclosure also provide a method of protecting a substrate, the method comprising coating the substrate with a mixture according to examples of the disclosure curable to provide an intumescent coating material.

In some examples, the method comprises providing the substrate with a plurality of layers of the intumescent coating material. The method may also comprise providing a mesh between respective layers of the intumescent coating material, for instance, a stainless steel, basalt or glass fibre mesh. Alternatively, the method may provide an intumescent coating without a mesh.

Examples 6 and 7 in table 2 below are comparative examples. Comparative example 6 does not comprise a diluent and comprises 36.27% by weight of an intumescent ingredient, which comprises titanium dioxide, ammonium polyphosphate, melamine and pentaerythritol.

Comparative example 7 does comprises a diluent (10.56% by weight of a silicone plasticiser) and comprises 34.06% by weight of an intumescent ingredient, which comprises titanium dioxide, ammonium polyphosphate, melamine and pentaerythritol.

cluded from a comparison of the test data from examples 6 and 7 that materials comprising a diluent but less than 50% by weight of an intumescent ingredient (example 7) perform significantly less well than materials comprising a similar amount of intumescent ingredient but no diluent (example 6). The applicant has surprising found that cured materials formed from a reaction mixture which comprises a diluent and at least 50% by weight of an intumescent ingredient perform significantly better than comparative examples with less than 50% by weight intumescent ingredient and with or without a diluent.

There is thus described a mixture curable to provide an intumescent coating material, an intumescent coating material, a method of providing an intumescent coating material, an intumescent coating, and a method of protecting a substrate with an intumescent coating with a number of advantages as detailed above. Furthermore, intumescent coating materials and intumescent coatings according to examples of the disclosure have been shown to be more resilient to weathering than conventional coatings. Accordingly, examples of the disclosure will not split or crack due to thermal expansion/contraction of the substrate and will not degrade due to high/low ambient temperatures or exposure to sunlight.

TABLE 2

| Component | Specific example of component | Specific example 6 (wt %) (comparative) | Specific example 7 (wt %) (comparative) |
| --- | --- | --- | --- |
| Silicone polymer | Silicone polymer with at least one condensable or hydrolyzable group | 51.17 | 38.41 |
| Cross-linking agent & metallic catalyst | Reactive silane cross-linker & tin catalyst | 5.12 | 3.84 |
| Non-reactive diluent | Silicone plasticiser | | 10.56 |
| Non-reactive diluent | Hydrocarbon plasticiser | | |
| Reactive diluent | Epoxy functional polydialkyl siloxane | | |
| Volatile diluent | Xylene | | |
| Reinforcing fibres | Basalt fibres | 3.72 | 3.49 |
| Infrared blocker | Titanium dioxide | 5.58 | 5.24 |
| Phosphorus containing compound | Ammonium polyphosphate | 18.6 | 17.47 |
| Gas source | Melamine | 6.51 | 6.11 |
| Carbon source | Pentaerythritol | 5.58 | 5.24 |
| Endothermic fire retardant | Zinc borate | 1.86 | |
| Filler | HGMS (glass microspheres) | | 9.64 |
| Thixotropic agent | Fumed silica | 1.86 | |

Table 3 below indicates fire test data, which is a measure of the time for the average temperature of a material (i.e. the cured material resulting from the mixtures of example 1 and comparative examples 6 and 7) to reach 538° C. (1000° F.), which is the failure criteria for the UL1709 fire test standard.

TABLE 3

| Sample | Example 1 | Example 6 (comparative) | Example 7 (comparative) |
| --- | --- | --- | --- |
| Time to 538° C. (mins) | 117.5 | 97 | 60 |

It is apparent from table 1 that the time for the average temperature of example 1 to reach 538° C. (1000° F.) is longer than for comparative examples 6 and 7. Accordingly, example 1 has improved fire performance properties compared to examples 6 and 7. Furthermore, it may be con- Although embodiments of the present invention have been described in the preceding paragraphs with reference to various examples, it should be appreciated that modifications to the examples given can be made without departing from the scope of the invention as claimed. For instance, the proportions of the respective components can be varied to provide a required curing time and speed for different applications, and also to modify the materials viscosity. A different number or thickness of layers of intumescent coating material may be provided, for instance, to provide a different level of protection to a fire event. In examples comprising titanium dioxide, the titanium dioxide may also function, for example, as a pigment, a fluxing agent or char reinforcer.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . ." or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A mixture curable to provide an intumescent coating material, wherein the mixture comprises a silicone polymer, a cross-linker, a diluent and an intumescent ingredient, wherein the mixture comprises at least 50% by weight of the intumescent ingredient and wherein the diluent comprises a plasticiser.

2. A mixture according to claim 1, wherein the mixture comprises 50 to 68% by weight of the intumescent ingredient.

3. A mixture according to claim 1, wherein the intumescent ingredient comprises a phosphorus containing compound, a gas source, and a carbon source.

4. A mixture according to claim 1, wherein the intumescent ingredient comprises an infrared blocker.

5. A mixture according to claim 1, wherein the mixture comprises 1 to 35% by weight of the diluent.

6. A mixture according to claim 1, wherein the mixture comprises 2 to 15% by weight of the diluent.

7. A mixture according to claim 1, wherein the diluent comprises an organic solvent.

8. A mixture according to claim 7, wherein the diluent comprises xylene, toluene, alkanes, alkenes, or aromatics.

9. A mixture according to claim 1, wherein the plasticiser comprises trimethyl terminated polydimethyl siloxane with viscosity range of 0.65 cSt to 1000 cSt, a mixture of aliphatic and aromatic hydrocarbons with 7-30 carbon atoms, mellitates, phthalates, sebacates or adipates.

10. A mixture according to claim 1, wherein the diluent comprises functionalised polydialkyl siloxane, polydialkyl siloxane polyether copolymer chains with hydroxy, alkoxy, carbinol, epoxy, vinyl, SiH, acrylate, isocyanate or amino functionalities.

11. A mixture according to claim 1, wherein the mixture comprises 0.25 to 6% by weight of an endothermic fire retardant.

12. A mixture according to claim 1, wherein the mixture comprises 0.25 to 8% by weight reinforcing fibres.

13. A mixture according to claim 1, wherein the mixture comprises 0.25 to 15% by weight filler.

14. A mixture according to claim 1, wherein the mixture comprises 14 to 31% by weight of the silicone polymer and 1 to 10% by weight of the cross-linker.

15. A mixture according to claim 1, wherein the mixture comprises less than 5% by weight expandable graphite.

16. A mixture according to claim 1, wherein the mixture is substantially free of expandable graphite.

17. An intumescent coating material, wherein the intumescent coating material is the cured reaction product of a mixture comprising a silicone polymer, a cross-linker, a diluent and an intumescent ingredient, wherein the mixture comprises at least 50% by weight of the intumescent ingredient, and wherein the diluent comprises a plasticiser.

18. A method of protecting a substrate, the method comprising:
coating the substrate with a mixture curable to provide an intumescent coating material, wherein the mixture comprises a silicone polymer, a cross-linker, a diluent and an intumescent ingredient, wherein the mixture comprises at least 50% by weight of the intumescent ingredient, and wherein the diluent comprises a plasticiser; and
allowing the mixture to cure.

* * * * *